FIG. 1

AXEL CHRISTENSEN
CHI SHENG KUO
INVENTORS.

March 18, 1969  A. CHRISTENSEN ET AL  3,433,600
APPARATUS FOR EXOTHERMIC CATALYTIC REACTIONS
Filed Oct. 20, 1965

AXEL CHRISTENSEN
CHI SHENG KUO
INVENTORS.

United States Patent Office 3,433,600
Patented Mar. 18, 1969

3,433,600
APPARATUS FOR EXOTHERMIC
CATALYTIC REACTIONS
Axel Christensen, Stamford, Conn., and Chi Sheng Kuo, Mount Kisco, N.Y., assignors to Chemical Construction Corporation, New York, N.Y., a corporation of Delaware
Filed Oct. 20, 1965, Ser. No. 498,872
U.S. Cl. 23—288    15 Claims
Int. Cl. B01j 9/04; C01c 1/04

ABSTRACT OF THE DISCLOSURE

An apparatus is provided for carrying out exothermic catalytic reactions, in which the main process fluid stream is passed downwards through a plurality of catalyst beds arranged in vertical series in a container. The hot process fluid stream is quenched to a lower temperature by injection of a cold quench fluid between beds, by means of apparatus elements and structure including whirl vanes and baffles or curved whirl conduits which provide a circular motion during mixing and also divide the fluid streams into portions during mixing, so as to provide rapid mixing and uniform quench of the hot process fluid stream between catalyst beds.

---

The present invention relates to an improved quench-type converter for carrying out an exothermic catalytic reaction in a plurality of stages, in which interbed cooling of the process fluid stream between stages of reaction is accomplished by the injection of a cold quench fluid stream into the main process fluid stream. The invention particularly relates to improved apparatus for rapidly and uniformly mixing the cold quench fluid stream with the main process fluid stream, and an improved arrangement of apparatus for introducing quench fluid streams between catalyst beds when three or more beds or catalytic stages are provided in series.

The general concept of injecting a cold quench fluid stream into a main process fluid stream between stages or beds of exothermic catalytic reaction, in order to produce a cooling effect, is well established. The cold quench fluid stream is usually a portion of component of the main process stream, which bypasses the initial catalyst bed or beds and thus is not catalytically reacted in the initial bed and remains at a low temperature until addition to the main process fluid stream. In other cases, the cold quench fluid stream may be catalytically inert and will not enter into the reaction. In such cases, the quench fluid stream will usually be a liquid such as water or hydrocarbon oil, which is injected and concomitantly also vaporized into the hot process fluid stream when this stream is gaseous, and provides a cooling effect primarily by the absorption of the heat of vaporization. Prior art patents showing arrangements of interbed quench cooling with various mixing devices include U.S. Patents Nos. 3,164,446, 3,146,074, 3,010,807, 2,632,692, 2,512,586, 2,475,855 and 2,104,858.

A major difficulty in the efficient operation of a quench-type converter involves the problem of rapidly and uniformly mixing the quench fluid stream into the main process fluid stream, so as to obtain uniform and complete mixing and cooling prior to passage of the process fluid stream into the next succeeding catalyst bed. This is particularly true in cases where the process fluid stream is gaseous since in such cases the process fluid stream will usually flow through the apparatus at a high velocity, and thus the quench fluid stream must be rapidly and uniformly mixed into a large volume of hot velocity gas. Such a situation is encountered in the operation of quench-type multi-bed catalytic converters for the synthesis of ammonia from hydrogen-nitrogen synthesis gas or the synthesis of methanol from hydrogen-carbon monoxide synthesis gas. Close control of gas stream temperature within the converter is highly important in these processes, in order to attain maximum catalytic conversion. In addition, since the synthesis reactions are exothermic, close temperature control is required in order to prevent overheating of the gaseous process stream within a catalyst bed, which could exert a deleterious effect on the activity of the catalyst and also shorten catalyst life due to physical deterioration or spalling. Finally, an excessive rise in temperature may cause decomposition of the reaction product or other undesirable reactions. Thus, it is extremely important in practical operation of quench-type catalytic converters to attain rapid and uniform mixing of the quench fluid stream into the main process fluid stream between stages or beds of catalytic conversion, and thus to prevent an unquenched hot process fluid stream component from entering a catalyst bed, since no significant additional mixing of a quench fluid stream with the main process fluid stream can take place after the process fluid stream has entered the succeeding catalyst bed.

In the present invention, the hot process fluid stream is diverted horizontally inwards towards the central axis of the converter below an initial catalyst bed, and is mixed with the quench fluid stream by the provision of apparatus which exerts a whirling circular mixing effect, followed by the provision of baffle structure which produces a diversionary lateral motion of the mixing fluid streams, thus attaining rapid and uniform mixing of the streams in a compact space between catalyst beds. In one embodiment of the present invention, initial whirling of the inflowing hot process fluid stream is accomplished by the provision of a plurality of vertical whirl vanes which are disposed in a circular pattern. A central vertical conduit is provided, for injection of a quench fluid stream outwardly into the inwardly whirling hot process fluid stream. The resultant partially mixed fluid streams are then passed downwards through at least two horizontal layers of segmental or sector-shaped baffles which are spaced apart and disposed so that each baffle of the lower layer is below the opening defined between two adjacent baffles of the upper layer. Thus, a diversionary lateral motion of the mixing fluid stream is accomplished, with rapid and uniform mixing being attained prior to passage of the mixed fluid stream to the next succeeding catalyst bed.

An alternative embodiment of the present invention involves the provision of a plurality of curved conduits, which extend outwards from openings in the central quench fluid conduit and serve to discharge the quench fluid outwards into the inflowing hot process fluid stream with a whirling circular motion. In this embodiment, the whirl vanes are omitted, and the hot process fluid stream flows directly inwards. A horizontal gas collection baffle is provided below the curved conduits and is provided with a plurality of openings. The gas collection baffle serves to divert the mixing fluid streams to the openings, each of which is provided with a curved conduit which curves downwards and outwards, and serves to discharge a portion of the mixed fluid above the next lower catalyst bed.

When three or more catalyst beds are provided in series, the quench streams are preferably introduced between beds by the provision of at least two central conduits, one of which extends axially downwards into the converter container and one of which extends axially upwards into the converter container. When more than two quench streams are required, as when four or more beds are provided in series, concentric central conduits are employed, with one quench stream flowing through the annular space between the conduits to a discharge opening.

The principal advantage of the apparatus of the present invention is that the cold quench fluid stream is rapidly and uniformly mixed with the hot process fluid stream between catalyst beds, and thus the process fluid stream is totally and uniformly cooled to a lower temperature prior to further catalytic reaction in the next lower catalyst bed. As discussed supra, this is a highly important result and produces uniform catalytic reaction for sustained periods of time at maximum production rates without process upsets or shutdowns. Another advantage is that the apparatus is composed of individual apparatus components which are quite simple and are readily fabricated. A further advantage is that the mixing structure of the apparatus may be placed in position in the converter without permanent attachment to the converter structure, and thus may be made portable in practice and may readily removed from the converter during shutdowns, thus providing manual access to all of the internal compartments of a multi-bed converter for such purposes as catalyst removal and replacement.

It is an object of the present invention to provide an improved apparatus for exothermic catalytic reactions.

Another object is to provide an improved apparatus for mixing a cold quench fluid stream with a hot process fluid stream between catalyst beds in a multi-bed catalytic converter.

A further object is to quench-cool a hot process fluid stream between catalyst beds in a multi-bed catalytic converter using a cold quench fluid stream in an improved manner.

An additional object is to provide an apparatus for mixing a cold quench fluid stream with a hot process fluid stream in a multi-bed catalytic converter which attains rapid and uniform mixing in a compact structure.

Still another object is to provide an apparatus for mixing a cold quench fluid stream with a hot process fluid stream in a multi-bed catalytic converter which is portable and may be placed in position without permanent attachment to the converter internals.

These and other objects and advantages of the present invention will become evident from the description which follows. Referring to the figures, FIGURE 1 provides an overall elevation view of one embodiment of the present invention.

Figure 1:
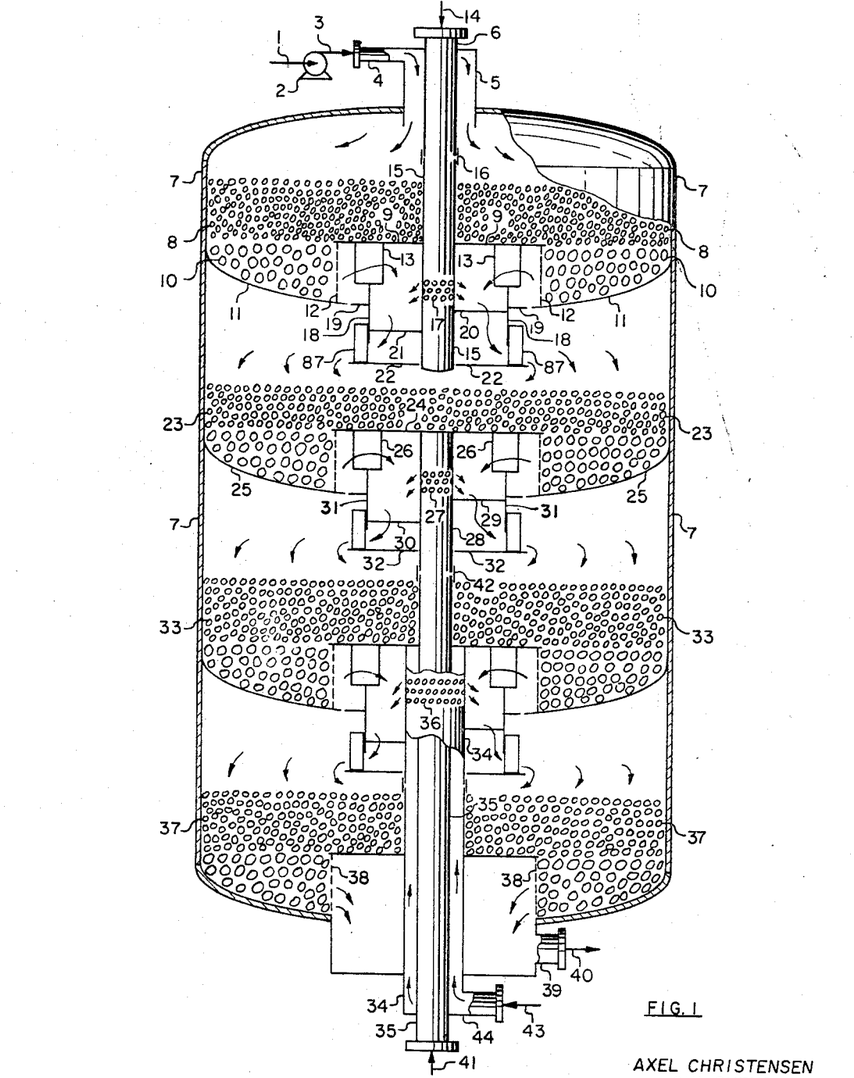

Referring now to FIGURE 1, the process fluid stream 1 is passed by blower or pump 2 as stream 3 into conduit 4, and flows into the annular passage between outer concentric circular conduit 5 and inner central vertical cylindrical conduit 6. The process fluid stream is then discharged from conduit 5 into catalytic converter vessel 7 above catalyst bed 8. Vessel 7 is generally a vertically oriented cylindrical container. The process fluid stream flows downward through catalyst bed 8, and is partially reacted or converted to a desired product or compound by an exothermic catalytic reaction, which results in an elevation of the temperature of the process fluid stream.

The hot partially reacted process fluid stream next flows through a layer 10 consisting of catalytically inert particles which is disposed below the bed 8 and consists of a bed of inert particles such as ceramic balls or Raschig rings. The layer 10 is supported by fluid diversion baffle 11 and may extend over circular horizontal central baffle 9, which is centrally disposed immediately below the bed 8. As will appear infra, the baffle 9 will preferably consist of two parallel spaced apart horizontal plates. The upper plate, not shown in FIG. 1, is perforated to permit gas to flow vertically down through the section of the catalyst bed 8 immediately above the baffle 9 without lateral deflection of the gas stream before the gas reaches the lower baffle plate 9. In addition, as will appear infra, the baffle plate 9 may be perforated along its outer edge, to permit annular downwards gas flow external to the gas mixing section of the apparatus. The process fluid stream is diverted horizontally inwards in layer 10 and towards the central axis of the container 7 by the fluid diversion baffle 11, which extends inwards and downwards from the wall of container 7 below layer 10 to a circular central opening and is preferably of generally arcuate or semi-elliptical form. The process fluid stream next passes horizontally inwards through the substantially vertical cylindrical foraminous partition 12 which extends upwards from the inner end of baffle 11 to the outer edge of baffle plate 9. Partition 12 serves to permit inward process fluid flow while retaining the particle layer 10 in position. The process fluid now passes inwards between the spaced apart vertical rectangular whirl vanes 13, which extend downwards from the baffle plate 9 and are arranged in a circle. Each whirl vane is inclined relative to the inward direction of process fluid flow, so as to impart a whirling circular motion to the inflowing process fluid stream. Thus, the hot process fluid stream follows a whirling circular flow path in flowing downwards below baffle plate 9 after passing between whirl vanes 13.

A cold quench fluid stream 14, which may be of the same composition as stream 1, is passed into central vertical cylindrical conduit 6, and flows downwards into central vertical conduit 15 which is connected to conduit 6 by disconnectable sliding joint 16. The quench fluid stream is discharged outwards from conduit 15 and into the whirling circular stream of hot process fluid through openings 17 which are opposite the lower ends of vanes 13. Partial mixing of the streams thus takes place, with concomitant cooling of the process fluid stream. Further mixing of the stream is accomplished by passing the fluid streams mixture downwards through the vertical cylindrical diversion conduit 18. A flat ring-shaped horizontal annular baffle 19 is provided between conduit 18 and the end of baffle 11 so as to prevent direct downward flow of the hot process fluid stream and direct this stream to the vanes 13. At least two horizontal layers of spaced apart substantially sector-shaped baffles such as upper baffle 20 and lower baffle 21 are provided within conduit 18. The baffles such as 20 are spaced apart in the same horizontal plane and extend between conduit 18 and conduit 15, and the baffles 21 also extend between conduit 18 and conduit 15 below baffles 20. As will appear infra, the baffles 21 are disposed below the opening defined between two adjacent baffles 20. In this manner, a splitting of the fluid stream and lateral or horizontal mixing is attained, and the fluid stream discharged from the lower end of conduit 18 consists of a mixture of process fluid and quench fluid, with the process fluid thus being uniformly and completely cooled to a lower temperature. In order to insure maximum mixture of the gas streams, additional vertical whirl vanes 87, similar to vanes 13, may be provided. Vanes 87 are spaced apart and extend downwards from the lower end of conduit 18, and serve to impart a further whirling motion to the combined gas stream being discharged from conduit 18.

The downflowing process fluid stream discharged from conduit 18 is now directed outwards by the horizontal circular fluid dispersion baffle 22, which is preferably attached to vanes 87, and flows downwards into catalyst bed 23, in which further exothermic catalytic reaction takes place. The resulting hot process fluid stream flowing downwards from bed 23 is now quench-cooled in a manner and using apparatus similar to that described supra with respect to the hot process fluid stream discharged from bed 8. Thus, the hot process fluid stream is diverted horizontally inwards below central baffle plate 24 by baffle 25 which extends inwards from the wall of container 7, and is provided with a whirling circular motion by whirl vanes 26. A cold quench fluid stream is injected outwards from openings 27 in central conduit 28 and into the whirling process fluid stream. The upper end of conduit 28 is attached to baffle plate 24. Final lateral mixing is accomplished as the fluid stream flows downward across and past the horizontal baffles 29 and 30 which are disposed within vertical cylindrical diversion conduit 31. The cooled process fluid stream is dispersed outwards by horizontal circular fluid dispersion baffle 32, and flows downwards into the next succeeding catalyst bed 33.

Further exothermic catalytic reaction of the downflowing process fluid stream takes place within bed 33, and the resulting hot process fluid stream is quench-cooled in a manner similar to that described supra, with cold quench fluid being discharged from the annular passage between outer conduit 34 and inner concentric conduit 35 through openings 36 in conduit 34. The resulting cooled process fluid stream is then further reacted in catalyst bed 37, and the fully reacted process fluid stream is discharged through foraminous partition 38 and passed to product utilization or recovery via conduit 39 as stream 40.

A cold quench fluid stream 41 is passed upwards through central vertical cylindrical conduit 35, which is connected by joint 42 to conduit 28. Joint 42 is similar to joint 16. The quench stream 41 is thus discharged through openings 27. Similarly, quench stream 43 is passed via conduit 44 into the annular passage defined between concentric conduits 35 and 34, and flows upward to discharge through openings 36. Quench fluid streams 41 and 43 may be of the same composition as stream 1.

Figure 2:
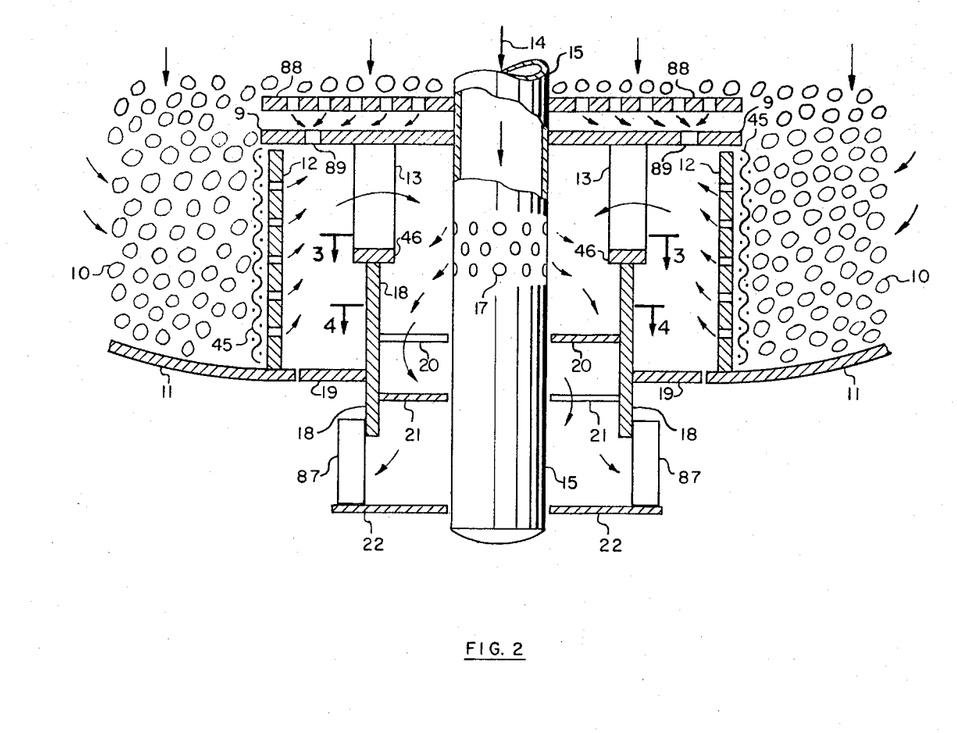
FIGURE 2 shows a detailed sectional elevation view of a section of the apparatus of FIGURE 1.

Referring now to FIGURE 2, an enlarged sectional elevation view of the fluid mixing apparatus between catalyst beds 8 and 23 is shown, together with auxiliary apparatus. A vertical cylindrical wire screen 45 is preferably provided external to perforated partition 12, in order to allow inwards gas flow while preventing possible blockage of the openings in partition 12 by particles 10 or the passage of solid particles 10 of reduced size through the openings in partition 12. In addition, a flat horizontal ring-shaped baffle 46 is preferably provided at the bottoms of vanes 13, in order to completely divert the inflowing hot process fluid stream horizontally past vanes 13 and prevent possible by-passing of the vanes 13 by the hot process fluid stream, which would otherwise tend to partially flow inwards over the upper end of conduit 18 and then directly downwards without attaining whirling circular flow.

The preferred configuration of the baffle plate 9 is also shown in FIGURE 2. Thus, an upper horizontal perforated plate 88 is provided parallel to plate 9, with the layer 10 extending above the plate 88. A portion of the downflowing process gas stream flows through the openings in plate 88, and is diverted outwards by plate 9, thereafter flowing at least in part through the openings 89 in lower baffle plate 9, which are provided adjacent to the outer edge of plate 9 and permit annular downwards gas flow external to vanes 13.

Figure 3:
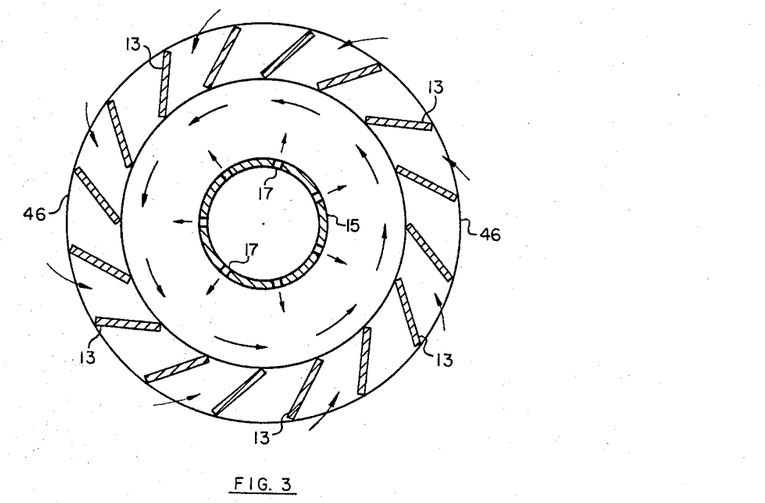
FIGURE 3 is a sectional plan view of FIGURE 2, taken on section 3—3.

FIGURE 3 presents a sectional plan view of FIGURE 2 taken on section 3—3, and shows the arrangement of the whirl vanes in a circular pattern over baffle 46, as well as the central conduit 15 and the flow of the fluid streams.

Figure 4:
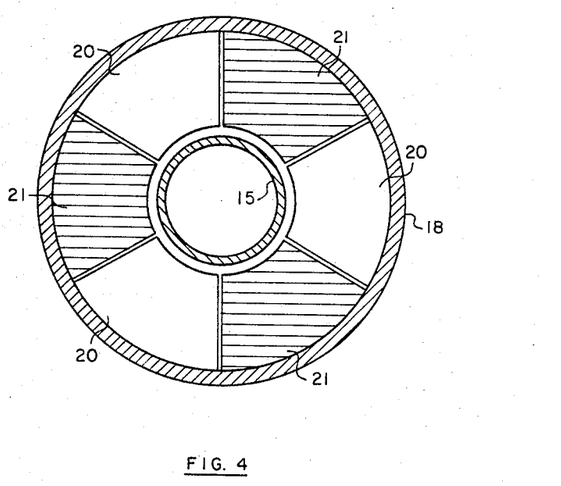
FIGURE 4 is a sectional plan view of FIGURE 2, taken on section 4—4, FIGURE 5 provides an overall elevation view of an alternative embodiment of the present invention.

FIGURE 4 is a sectional plan view of FIGURE 2 taken on section 4—4, and shows the arrangement of the substantially sector-shaped fluid mixing baffles 20 and 21 extending between conduits 18 and 15, with each baffle 21 being disposed below the opening defined between two adjacent baffles 20.

Figure 5:
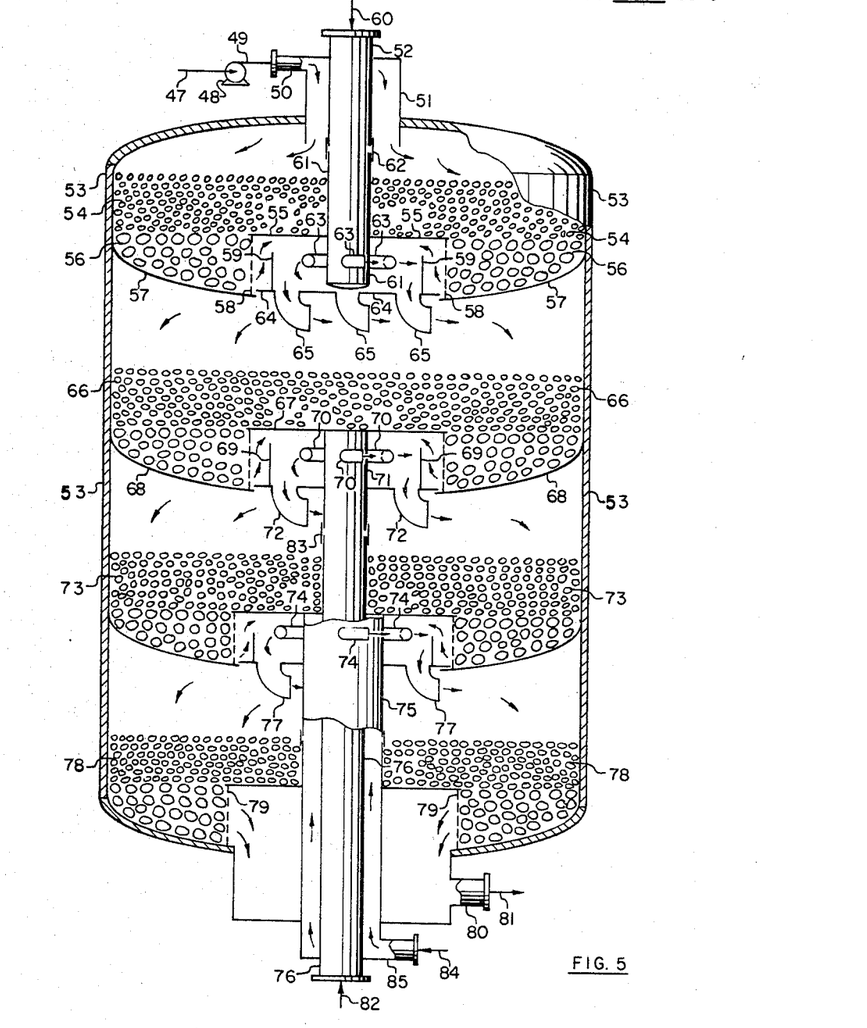

FIGURE 5 presents an alternative embodiment of the present invention, in which whirling circular mixing is produced by providing a whirling circular motion for the quench fluid stream being discharged into the hot process fluid stream. The process fluid stream 47 is passed by blower or pump 48 as stream 49 into conduit 50, and flows into the annular passage between outer concentric circular conduit 51 and inner central vertical cylindrical conduit 52. The process fluid stream is then discharged from conduit 51 into catalytic converter vessel 53 above catalyst bed 54. Vessel 53 is generally a vertically oriented cylindrical container. The process fluid stream flows downwards through catalyst bed 54, and is partially reacted or converted to a desired product or compound by an exothermic catalytic reaction, which results in an elevation of the temperature of the process fluid stream.

The hot partially reacted process fluid stream is now diverted outwards from catalyst bed 54 by the circular horizontal central baffle plate 55 which is centrally disposed immediately below the bed 54. Plate 55 will preferably consist of two parallel plates, with the upper plate being perforated, similar to plate 9 and 88 described supra. The process fluid stream next flows through a layer 56 consisting of catalytically inert particles which is disposed below the bed 54 and consists of a bed of inert particles such as ceramic balls or Raschig rings. The process fluid stream is diverted horizontally inwards in layer 56 and towards the central axis of the container 53 by the fluid diversion baffle 57, which extends inwards and downwards from the wall of container 53 below layer 56 to a circular central opening and is preferably of generally arcuate or semi-elliptical form. The process fluid stream next passes horizontally inwards through the substantially vertical cylindrical foraminous partition 58 which extends upwards from the inner end of baffle 57 to the outer edge of baffle plate 55. Partition 58 serves to permit inward process fluid flow while retaining the particle layer 56 in position. The process fluid stream now is diverted upwards and over the upper end of vertical cylindrical fluid diversion baffle 59, and continues flowing inwards towards the central axis of the container 53 below baffle plate 55.

A cold quench fluid stream 60, which may be of the same composition as stream 47, is passed into central vertical cylindrical conduit 52, and flows downwards into central vertical conduit 61 which is connected to conduit 52 by joint 62. A plurality of spaced apart circular openings are provided in the wall of conduit 61 below baffle plate 55, and curved cylindrical conduits 63 extend outwards from the openings in conduit 61. The conduits 63 are curved in the same direction of rotation, and serve to discharge the quench fluid stream 60 outwards into the inwardly flowing hot process fluid stream with a whirling circular motion. Partial mixing of the streams thus takes place, with concomitant cooling of the process fluid stream.

Further mixing of the fluid streams is accomplished by the provision of circular horizontal gas collection baffle 64, which extends across the circular central opening in fluid diversion baffle 57 and is provided with a plurality of circular openings which are preferably arranged in a circle. The downflowing whirling mixture of fluid streams is thus split and is diverted into the openings in baffle 64. Curved cylindrical conduits 65 extend downwards and outwards from the openings in baffle 64, and serve to discharge a uniform mixture of process fluid and quench fluid outwardly below baffle 64, with the process fluid thus being uniformly and completely cooled to a lower temperature.

The resulting cooled process fluid stream now flows downwards from conduits 65 and into catalyst bed 66, in which further exothermic catalytic reaction takes place. The resulting hot process fluid stream flowing downwards from bed 66 is now quench-cooled in a manner and using apparatus similar to that described supra with respect to the hot process fluid stream discharged from bed 54. Thus, the hot process fluid stream is diverted horizontally inwards below central baffle plate 67 by baffle 68 which extends inwards from the wall of container 53. The inflowing hot process fluid stream flowing over the upper end of baffle 69 mixes with the cold quench fluid stream projected outwards with a whirling circular motion by curved conduits 70 which extend outwards from openings in central vertical cylindrical conduit 71. The resulting mixed fluid stream flows downwards and outwards through curved conduits 72, and flows downwards into the next succeeding catalyst bed 73.

Further exothermic catalytic reaction of the downflowing process fluid stream takes place within bed 73, and the resulting hot process fluid stream is quench-cooled in a manner similar to that described supra, with cold quench fluid stream being discharged with a whirling circular motion from curved conduits 74, which extend outwards from openings in the wall of outer concentric cylindrical conduit 75 and discharge quench fluid derived from the annular passage between conduit 75 and inner concentric cylindrical conduit 76. The resulting cooled process fluid stream discharged outwardly through curved conduits 77 is further reacted in catalyst bed 78, and the fully reacted process fluid stream is discharged through foraminous partition 79 and passed to product utilization or recovery via conduit 80 as stream 81.

A cold quench fluid stream 82 is passed upwards through central vertical cylindrical conduit 76, which is connected by joint 83 to conduit 71. The quench stream 82 is thus discharged through curved conduits 70. Similarly, quench stream 84 is passed via conduit 85 into the annular passage defined between concentric conduits 76 and 75, and flows upward to discharge through curved conduits 74. Quench fluid streams 82 and 84 may be of the same composition as stream 47.

Figure 6:
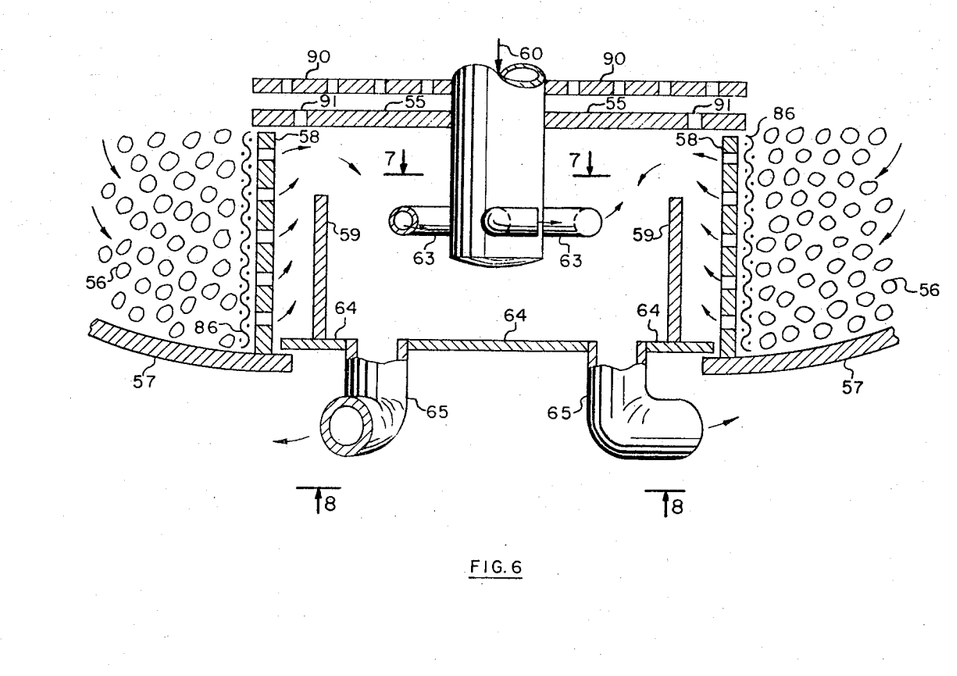
FIGURE 6 shows a detailed sectional elevation view of a section of the apparatus of FIGURE 5.

Referring now to FIGURE 6, an enlarged sectional elevation view of the fluid mixing apparatus between catalyst beds 54 and 66 is shown, together with auxiliary apparatus. A vertical cylindrical wire screen 86 is preferably provided external to perforated partition 58, in order to allow inwards gas flow while preventing possible blockage of the openings in partition 58 by particles 56 or the passage of solid particles 56 of reduced size through the openings in partition 58. The preferred configuration of the baffle plate 55 is also shown in FIG. 6. Thus, an upper horizontal perforated plate 90 is provided parallel to plate 55, with the layer 56 extending above the plate 90. A portion of the downflowing process gas stream flows through the openings in plate 90, and is diverted outwards by plate 55, thereafter flowing at least in part through the openings 91 in lower baffle plate 55, which are provided adjacent to the outer edge of plate 55 and permit annular downwards gas flow external to baffle 59.

Figure 7:
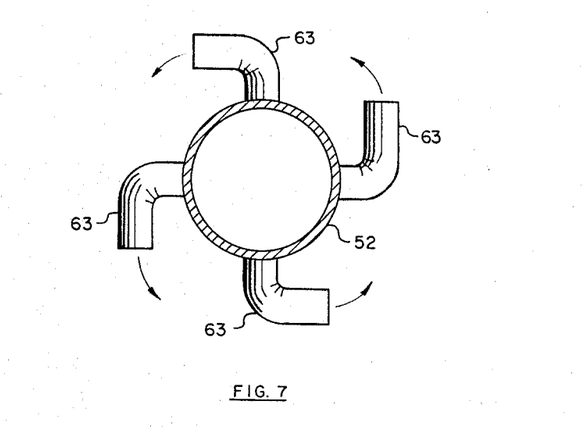
FIGURE 7 is a sectional plan view of FIGURE 6, taken on section 7—7.

FIGURE 7 presents a sectional plan view of FIGURE 6 taken on section 7—7, and shows the arrangement of the curved conduits 63 which extend outwards from openings in the wall of central conduit 61.

Figure 8:
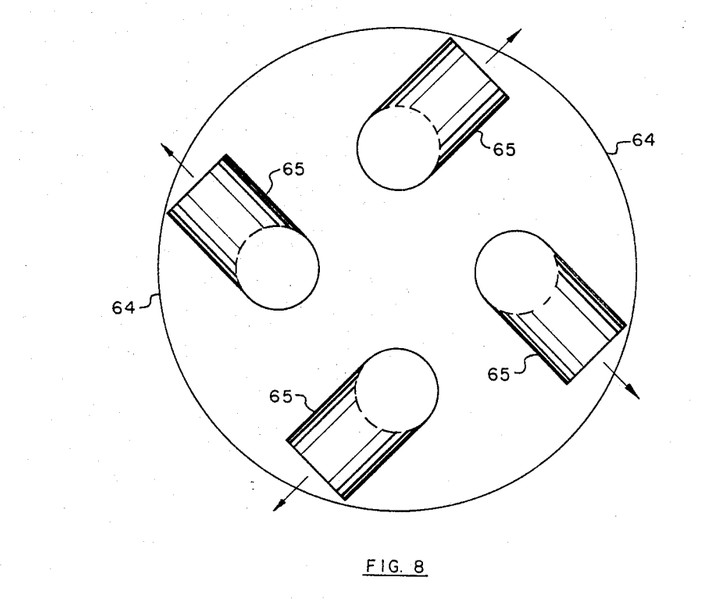
FIGURE 8 is a sectional plan view of FIGURE 6, taken on section 8—8.

FIGURE 8 is a sectional plan view of FIGURE 6 taken on section 8—8, and shows the arrangement of the curved conduits 65 which discharge the fully cooled process fluid stream outwards below circular horizontal baffle 64 with a whirling circular motion to insure complete mixing.

An important feature of the apparatus of the present invention is that the mixing sections may be made portable and without permanent attachment to the container, and thus manual access to the container internals is readily attained. Referring to FIGURES 1 and 2, it is apparent that partition 12 in this preferred embodiment is contiguous with respect to baffle 9 and is actually attached only to baffle 11. Similarly, baffle 19 in this preferred embodiment is contiguous with respect to baffle 11 and is attached to conduit 18. Thus, referring to FIG. 1, ready manual access to the container internals during shutdown is attained in practice by the initial removal of conduit 6 from joint 16. This permits manual access through outer conduit 5, which in actual design is of relatively large diameter. Then, the catalyst bed 8 and layer 10 may be manually removed by hand, preferably employing pneumatic conveyors. Following this, the mixing section consisting of elements 9, 15, 13, 18, 19, 20, 21, 87 and 22 may be moved as a unit, and may be either completely removed through conduit 5 or else lifted above partition 12 and placed to one side of the container above baffle 11. This permits manual access through the cental opening in baffle 11 to catalyst bed 23 and inert layer 25, which are then removed by hand. The mixing assemblage consisting essentially of elements 24, 26, 28, 29, 30, 31 and 32 is detached from joint 42 and moved upwards in the container, and may either be removed through the central opening in baffle 11 and conduit 5 or else placed to one side of the container above baffle 25. This then permits manual access through the central opening in baffle 25 to catalyst bed 33 and its associated layer of inert particles, which are also removed. In a like manner and by the provision of appropriate couplings or joints, access to catalyst bed 37 and its associated layer of inert particles may also be attained. Alternative means of entry into the container 7 above each catalyst bed may be provided in practice. These could consist of flanged openings disposed in the container wall above each catalyst bed and closed by blank flanges. In this event, the mixing sections would not have to be portable and permanent attachment of the various apparatus elements would be provided.

Similar considerations will also apply with respect to the portable nature of the mixing sections of the embodiments of the invention shown in FIGURE 5. Referring to FIGURES 5 and 6, the partition 58 is contiguous to baffle plate 55 and is actually attached to baffle 57. Circular baffle 64 is disposed over the central opening in baffle 57 and is contigous to baffle 57 but is not permanently attached thereto. Manual access to the interior of the container 53 is thus attained in a manner similar to that described supra with respect to container 7, namely by removing conduit 52, then removing bed 54 and layer 56, then removing elements 61, 55 and 63 as a unit, and finally removing elements 59, 64 and 65 as a unit. For this latter removal, small lifting holes may be provided in baffle 59 near its upper end.

Numerous alternatives within the scope of the present invention will occur to those skilled in the art. Thus, the various apparatus elements have been described as being of generally cylindrical or circular configuration. As an alternative, some or all of these elements may be of square or rectangular configuration in suitable instances. The layers of inert refractory shapes such as 10 in FIGURE 1 and 56 in FIGURE 5 may be omitted in some cases, and the corresponding catalyst beds 8 and 54 may then extend downwards to the respective baffles 11 and 57. This alternative would be advantageous in providing more catalyst volume per bed, or in reducing the overall height of the facility for a particular total catalyst volume. Referring to FIGURE 1, element 19 may be omitted and its function replaced by extending baffle 11 inwards and contiguous to element 18. The baffle 11 may alternatively extend horizontally inwards without extending downwards, or may be straight instead of curved. The whirl vanes such as 13 and 26 may be flat and straight as shown in section in FIGURE 3, or alternatively these elements may be curved so as to impart a greater whirling effect to the inflowing hot process fluid stream. Additional horizontal layers of spaced apart diversion baffles may be disposed within diversion conduit 18. The portion of conduit 15 below openings 17 may be omitted, in which case the baffles 20 and 21 will extend inwards to the central axis of container 7. Alternative support means may be provided for baffle 22, and baffle 22 may even be omitted in some instances. Referring to FIGURES 5 and 6, the baffle 57 may alternatively extend horizontally inwards without extending downwards, or may be straight instead of curved. The cylindrical diversion baffle 59 may be omitted in cases where less uniformity of mixing and temperature are permitted. However, in most cases baffle 59 will be provided in practice, since baffle 59 serves to guide the flow of fluid streams, both inside and outside the baffle. In addition baffle 59 serves to minimize or prevent thermal stress in partition 58 due to impingement of the quench stream, and also serves to position and provide a lifting element for the lower mixing assembly composed of elements 64 and 65.

We claim:

1. An apparatus for exothermic catalytic reactions which comprises a vertically oriented container, an upper bed composed of catalyst particles within said container, a lower bed composed of catalyst particles disposed within said container below said upper catalyst bed and spaced away from said upper catalyst bed, a fluid inlet to said container above said upper catalyst bed, a fluid outlet from said container below said lower catalyst bed, means to pass a process fluid stream through said fluid inlet whereby said process fluid stream flows downwards through said catalyst beds in series and is partially reacted in each bed with concomitant temperature rise, a horizontal central baffle below said upper catalyst bed, a fluid diversion baffle extending inwards and downwards from the wall of said container below said upper catalyst bed and terminating at a central opening, whereby the hot fluid stream discharged downwards from said upper catalyst bed is diverted horizontally inwards towards the central axis of said container below said central baffle, a substantially vertical foraminous partition extending upwards from the inner end of said fluid diversion baffle to the outer end of said central baffle, a plurality of spaced apart substantially vertical whirl vanes, said vanes extending downwards from said central baffle whereby a whirling circular motion is imparted to the inwardly flowing hot fluid stream discharged through said partition, a central vertical conduit extending into said container and terminating below said central baffle, said central conduit being coaxial with said container, means to pass a quench fluid stream through said central conduit, at least one opening in the wall of said central conduit, said opening being opposite the lower end of said vanes, whereby a quench fluid stream is discharged from said conduit into the whirling hot fluid stream, a vertical diversion conduit, said diversion conduit extending downwards from said vanes and external to said central conduit, a first plurality of substantially horizontal fluid mixing baffles, said first mixing baffles being spaced apart in the same horizontal plane and extending between said central conduit and said diversion conduit, and a secnod plurality of substantially horizontal fluid mixing baffles, said second mixing baffles being spaced apart in a horizontal plane below said first mixing baffles and extending between said central conduit and said diversion conduit, with each of said second mixing baffles being disposed below the opening defined between two adjacent first mixing baffles, whereby the hot fluid stream derived from said upper catalyst bed is uniformly mixed with said quench fluid stream and is thereby cooled, prior to discharge from the lower end of said diversion conduit into said lower catalyst bed.

2. An apparatus for exothermic catalytic reactions which comprises a vertically oriented container, an upper bed composed of catalyst particles within said container, a lower bed composed of catalyst particles disposed within said container below said upper catalyst bed and spaced away from said upper catalyst bed, a fluid inlet to said container above said upper catalyst bed, a fluid outlet from said container below said lower catalyst bed, means to pass a process fluid stream through said fluid inlet whereby said process fluid stream flows downwards through said catalyst beds in series and is partially reacted in each bed with concomitant temperature rise, a horizontal central baffle below said upper catalyst bed, a fluid diversion baffle extending inwards and downwards from the wall of said container below said upper catalyst bed and terminating at a central opening, whereby the hot fluid stream discharged downwards from said upper catalyst bed is diverted horizontally inwards towards the central axis of said container below said central baffle, a substantially vertical foraminous partition extending upwards from the inner end of said fluid diversion baffle to the outer end of said central baffle, a central vertical conduit extending into said container and terminating below said central baffle, said central conduit being coaxial with said container, means to pass a quench fluid stream through said central conduit, a plurality of spaced apart openings in the wall of said central conduit, said openings being substantially in the same horizontal plane and opposite said foraminous partition, a first pluarlity of curved conduits extending outwards from said openings in said central vertical conduit and curved in the same direction of rotation, whereby said quench fluid stream is discharged from said curved conduits into the inwardly flowing hot fluid stream with a whirling circular motion, a horizontal gas collection baffle extending across the central opening in said fluid diversion baffle and provided with a plurality of openings, and a second plurality of curved conduits extending downwards and outwards from said openings in said gas collection baffle, whereby the hot stream derived from said upper catalyst bed is uniformly mixed with said quench fluid stream and is thereby cooled, prior to flowing into said lower catalyst bed.

3. An apparatus for exothermic catalytic reactions with improved mixing of a cold quench fluid stream with a hot process fluid between catalyst beds which comprises a vertically oriented container, a first catalyst bed within said container, a fluid inlet to said container above said first catalyst bed, means to pass a process fluid stream through said fluid inlet whereby said process fluid stream flows downwards through said first catalyst bed and is partially reacted in said first bed with concomitant temperature rise, a horizontal central baffle below said first catalyst bed, a fluid diversion baffle extending inwards from the wall of said container below said central baffle and terminating at a central opening, whereby the hot fluid stream discharged downwards from said first catalyst bed is diverted horizontally inwards towards the central axis of said container below said central baffle, a substantially vertical foraminous partition extending upwards from the inner end of said fluid diversion baffle to the outer end of said central baffle, a plurality of spaced apart substantially vertical whirl vanes, said vanes extending downwards from said central baffle whereby a whirling circular motion is imparted to the inwardly flowing hot fluid stream discharged through said partition, a central vertical conduit extending below said central baffle, said conduit being coaxial with said container, means to pass a quench fluid stream through said conduit, at least one opening in the wall of said conduit, said opening being opposite said vanes, whereby said quench fluid stream is discharged from said conduit into the whirling hot fluid stream, a vertical cylindrical diversion conduit, said diversion conduit extending downwards from said vanes, a first plurality of substantially sector-shaped horizontal fluid mixing baffles, said first mixing baffles being spaced apart in the same horizontal plane and extending inwards from said diversion conduit, a second plurality of substantially sector-shaped horizontal fluid mixing baffles, said second mixing baffles being spaced apart in a horizontal plane below said first mixing baffles and extending inwards from said diversion conduit, with each of said second mixing baffles being disposed below the opening defined between two adjacent first mixing baffles, whereby the hot process fluid stream derived from said first catalyst bed is uniformly mixed with said quench fluid stream and is thereby cooled prior to discharge from the lower end of said diversion conduit, a second catalyst bed disposed within said container and below said diversion conduit, whereby the cooled process fluid stream discharged from said diversion conduit flows downward through said second catalyst bed and is further reacted, and a fluid outlet from said container below said second catalyst bed.

4. The apparatus of claim 3, combined with a fluid dispersion baffle, said dispersion baffle being horizontally disposed below the outlet of said diversion conduit and above said second catalyst bed, whereby the downflowing cooled fluid process stream is uniformly dispersed outwards into said second catalyst bed.

5. The apparatus of claim 4, combined with a second plurality of spaced apart substantially vertical whirl vanes, said second whirl vanes extending between said diversion conduit and said fluid dispersion baffle, whereby the cooled fluid process stream is dispersed outwards with a whirling circular motion.

6. The apparatus of claim 3, in which said fluid diversion baffle, which extends inwards from the wall of said container below said central baffle, extends in a downwards direction toward said central opening.

7. The apparatus of claim 3, in which a plurality of catalytically inert particles are disposed between said first catalyst bed and said fluid diversion baffle.

8. The apparatus of claim 3, combined with a perforated horizontal central baffle, said perforated baffle being below said first catalyst bed and disposed above and spaced away from said horizontal central baffle, whereby a portion of said process fluid stream flows downwards from said first catalyst bed and through the perforations in said perforated horizontal central baffle, and thereafter flows outwards between said perforated central baffle and said horizontal central baffle.

9. An apparatus for exothermic catalytic reactions with improved mixing of a cold quench fluid stream with a hot process fluid between catalyst beds which comprises a vertically oriented cylindrical container, a first catalyst bed within said container, a fluid inlet to said container above said first catalyst bed, means to pass a process fluid stream through said fluid inlet whereby said process fluid stream flows downwards through said first catalyst bed and is partially reacted in said first bed with concomitant temperature rise, a circular horizontal central baffle below said first catalyst bed, a fluid diversion baffle extending inwards and downwards from the wall of said container below said central baffle and terminating at a circular central opening, a plurality of catalytically inert particles disposed as a layer between said first catalyst bed and said fluid diversion baffle, whereby the hot fluid stream discharged downwards from said first catalyst bed is diverted horizontally inwards through said layer of inert particles and towards the central axis of said container below said central baffle, a substantially vertical cylindrical foraminous partition extending upwards from the inner end of said fluid diversion baffle to the outer end of said central baffle, a plurality of spaced apart substantially vertical rectangular whirl vanes, said vanes extending downwards from said central baffle whereby a whirling circular motion is imparted to the inwardly flowing hot fluid stream discharged through said partition, a central vertical cylindrical conduit extending below said central baffle, said conduit being coaxial with said container, means to pass a quench fluid stream through said conduit, a plurality of openings in the wall of said conduit, said openings being opposite the lower ends of said vanes, whereby said quench fluid stream is discharged from said conduit into the whirling hot fluid stream, a vertical cylindrical diversion conduit, said diversion conduit beng coaxial with said container and extending downwards from said vanes, a first plurality of substantially sector-shaped horizontal fluid mixing baffles, said first mixing baffles being spaced apart in the same horizontal plane and extending inwards from said diversion conduit, a second plurality of substantially sector-shaped horizontal fluid mixing baffles, said second mixing baffles being spaced apart in a horizontal plane below said first mixing baffles and extending inwards from said diversion conduit, with each of said second mixing baffles being disposed below the opening defined between two adjacent first mixing baffles, whereby the hot process fluid stream derived from said first catalyst bed is uniformly mixed with said quench fluid stream and is thereby cooled prior to discharge from the lower end of said diversion conduit, a horizontal circular fluid dispersion baffle, said dispersion baffle being centrally disposed below the outlet of said diversion conduit, whereby the cooled process fluid stream discharged from said diversion conduit is uniformly dispersed outwards, a second catalyst bed disposed within said container and below said dispersion baffle, and a fluid outlet from said container below said second catalyst bed.

10. An apparatus for exothermic catalytic reactions with improved mixing of a cold quench fluid stream with a hot process fluid between catalyst beds which comprises a vertically oriented container, a first catalyst bed within said container, a fluid inlet to said container above said first catalyst bed, means to pass a process fluid stream through said fluid inlet whereby said process fluid stream flows downwards through said first catalyst bed and is partially reacted in said first bed with concomitant temperature rise, a horizontal central baffle below said first catalyst bed, a fluid diversion baffle extending inwards from the wall of said container below said central baffle and terminating at a central opening, a substantially vertical foraminous partition extending upwards from the inner end of said fluid diversion baffle to the outer end of said central baffle, a central vertical conduit extending below said central baffle, said conduit being coaxial with said container, means to pass a quench fluid stream through said conduit, a plurality of spaced apart openings in the wall of said conduit, said openings being substantially in the same horizontal plane and opposite said foraminous partition, a first plurality of curved conduits extending outwards from said openings in said central vertical conduit and curved in the same direction of rotation, whereby said quench fluid stream is discharged from said curved conduits into the inwardly flowing hot fluid stream with a whirling circular motion, a horizontal gas collection baffle extending across the central opening in said fluid diversion baffle and provided with a plurality of openings, a second plurality of curved conduits extending downwards and outwards from said openings in said gas collection baffle, whereby the hot process fluid stream derived from said first catalyst bed is uniformly mixed and with said quench fluid stream and the cooled process fluid stream is discharged from said second curved conduits, a second catalyst bed below said second curved conduits, and a fluid outlet from said container below said second catalyst bed.

11. The apparatus of claim 10, in which said fluid diversion baffle, which extends inwards from the wall of said container, extends in a downwards direction towards said central opening.

12. The apparatus of claim 10, in which a plurality of catalytically inert particles are disposed between said first catalyst bed and said fluid diversion baffle.

13. The apparatus of claim 10, combined with a vertical cylindrical fluid diversion baffle, said baffle extending upwards from said horizontal gas collcetion baffle and external to the openings in said gas collection baffle and terminating adjacent to said first curved conduits, whereby the hot process fluid stream discharged inwards through said foraminous partition is diverted upwards external to said vertical cylindrical fluid diversion baffle, and thereafter flows inwards and downwards pass said first curved conduits.

14. The apparatus of claim 10, combined with a perforated horizontal central baffle, said perforated baffle being below said first catalyst bed and disposed above and spaced away from said horizontal central baffle, whereby a portion of said process fluid stream flows downwards from said first catalyst bed and through the perforations in said perofated horizontal central baffle, and thereafter flows outwards between said perforated central baffle and said horizontal central baffle.

15. An apparatus for exothermic catalytic reactions with improved mixing of a cold quench fluid stream with a hot process fluid stream between catalyst beds which comprises a vertically oriented cylindrical container, a first catalyst bed within said container, a fluid inlet to said container above said first catalyst bed, means to pass a process fluid stream through said fluid inlet, whereby said process fluid stream flows downwards through said first catalyst bed and is partially reacted in said first bed with concomitant temperature rise, a horizontal circular central baffle below said first catalyst bed, a fluid diversion baffle extending inwards and downwards from the wall of said container below said central baffle and terminating at a circular central opening, a plurality of catalytically inert particles disposed between said first catalyst bed and said fluid diversion baffle, a substantially vertical cylindrical foraminous partition extending upwards from the inner end of said fluid diversion baffle to the outer end of said central baffle, a central vertical cylindrical conduit extending below said central baffle, said conduit being coaxial with said container, means to pass a quench fluid stream through said conduit, a plurality of spaced apart circular openings in the wall of said conduit, said openings being substantially in the same horizontal plane and opposite said foraminous partition, a first plurality of curved cylindrical conduits extending outwards from said openings in said central vertical conduit and curved in the same direction of rotation, whereby said quench fluid stream is discharged from said first curved conduits with a whirling circular motion, a circular horizontal gas collection baffle extending across the circular central opening in said fluid diversion baffle and provided with a plurality of circular openings arranged in a circle, a vertical cylindrical fluid diversion baffle, said cylindrical diversion baffle extending upwards from said horizontal gas collection baffle and external to the openings in said gas collection baffle and terminating adjacent to said first curved conduits, whereby the hot process fluid stream discharged inwards through said foraminous partition is diverted upwards external to said vertical cylindrical fluid diversion baffle, and thereafter flows inwards and downwards past said first curved conduits and contacts the whirling circular stream of quench fluid, a second plurality of curved conduits extending downwards and outwards from said openings in said gas collection baffle, whereby the hot process fluid stream derived from said first catalyst bed is uniformly mixed with said quench fluid stream and the cooled process fluid stream is discharged from said second curved conduits, a second catalyst bed below said second curved conduits, and a fluid outlet from said container below said second catalyst bed.

References Cited

UNITED STATES PATENTS

| | | | |
|---|---|---|---|
| 677,670 | 7/1901 | Krauss et al. | 23—288 X |
| 1,909,378 | 5/1933 | Richardson | 23—289 X |
| 2,512,586 | 6/1950 | Stengel | 23—288 |
| 2,632,692 | 3/1953 | Korin et al. | 23—288 |
| 3,254,967 | 6/1966 | Wentworth | 23—288 |
| 3,353,924 | 11/1967 | Riopelle | 23—288 |
| 3,366,461 | 1/1968 | Christensen | 23—289 |

JOSEPH SCOVRONEK, *Primary Examiner.*

U.S. Cl. X.R.

261—97